Figure 1:
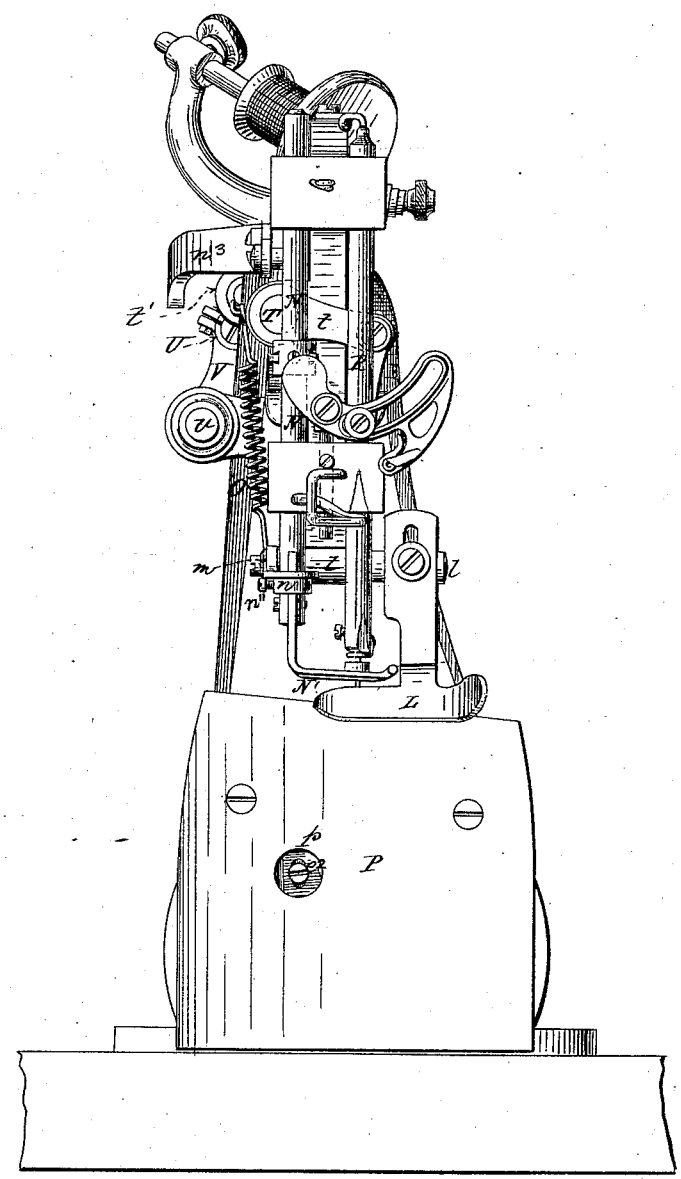

(No Model.)  W. F. BEARDSLEE.  6 Sheets—Sheet 1.
HAT SEWING MACHINE.

No. 279,523.  Patented June 19, 1883.

Witnesses:
David W. Williams
Austin A. Martin

Inventor:
William F. Beardslee (No Model.)

W. F. BEARDSLEE.

HAT SEWING MACHINE.

No. 279,523. Patented June 19, 1883.

Witnesses:
David W. Williams
Austin A. Martin

Inventor:
William F. Beardslee

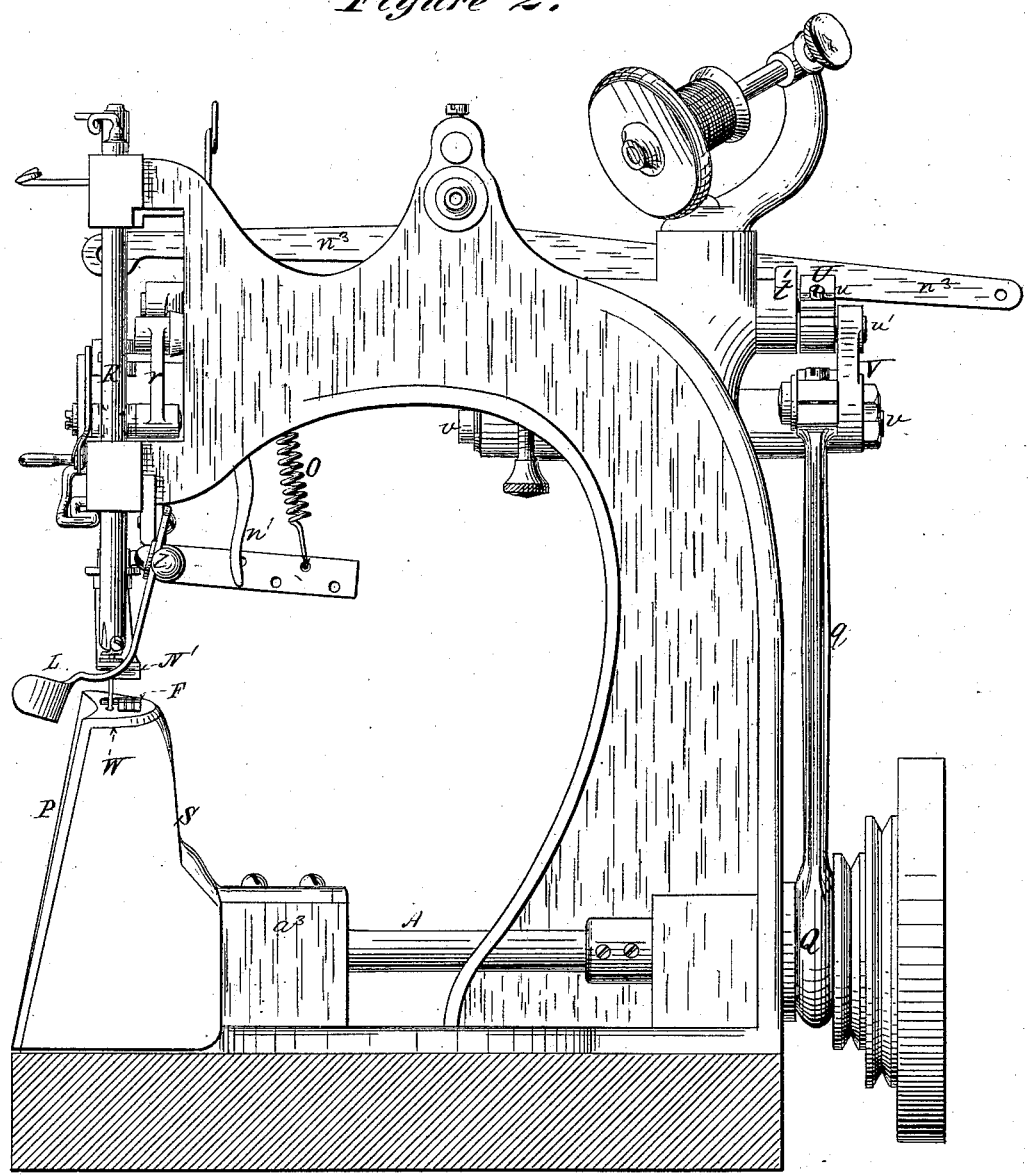

(No Model.)
W. F. BEARDSLEE.
HAT SEWING MACHINE.
No. 279,523. Patented June 19, 1883.
6 Sheets—Sheet 4.
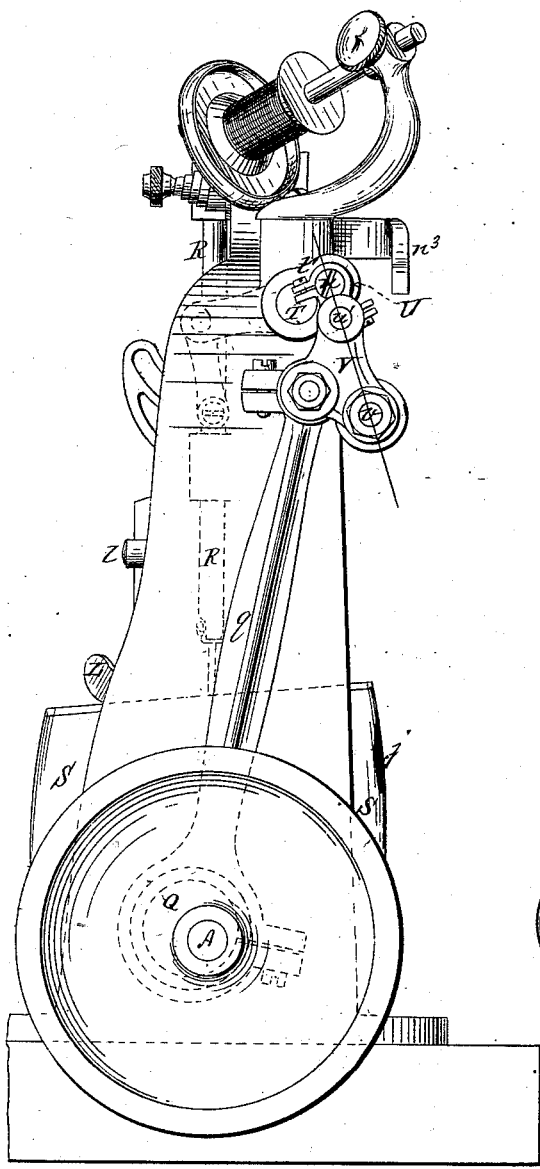
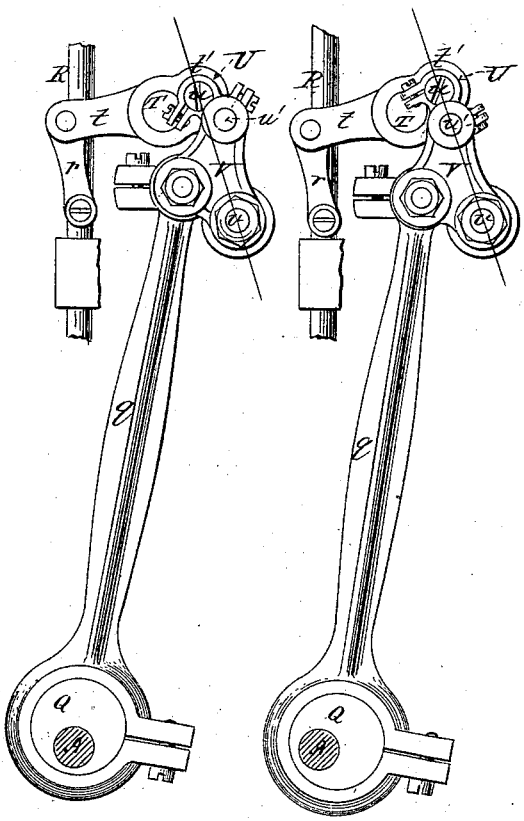
Witnesses:
David W. Williams
Austin A. Martin
Inventor:
William F. Beardslee (No Model.) 6 Sheets—Sheet 5.

W. F. BEARDSLEE.
HAT SEWING MACHINE.

No. 279,523. Patented June 19, 1883.

Witnesses:
David W. Williams
Austin A. Martin

Inventor:
William F. Beardslee (No Model.) 6 Sheets—Sheet 6.

W. F. BEARDSLEE.
HAT SEWING MACHINE.

No. 279,523. Patented June 19, 1883.

Witnesses:
David W Williams
Austin A Martin

Inventor:
William F. Beardslee

UNITED STATES PATENT OFFICE.

WILLIAM F. BEARDSLEE, OF BOSTON, MASSACHUSETTS.

HAT-SEWING MACHINE.

SPECIFICATION forming part of Letters Patent No. 279,523, dated June 19, 1883.

Application filed December 1, 1882. (No model.)

*To all whom it may concern:*

Be it known that I, WILLIAM F. BEARDSLEE, of the city of Boston, in the county of Suffolk and State of Massachusetts, have invented certain new and useful Improvements in Sewing-Machines, of which the following is a specification.

My improvements are applicable, more or less, to all styles and classes of sewing-machines, but are here described and shown as adapted to machines for sewing "sweats" into hats, and other similar lock-stitch machines belonging to the class known as "post" machines, in which the work-plate, feed, &c., are elevated sufficiently above the driving-shaft to allow them to project upward into or between parts of the article to be operated upon.

One of the main objects of my invention is to adapt a machine to sewing sweats to hats having either close-roll or large curved brims at or approximating the junction of the side crown and brim, so that the hat-band, when in position, will cover the stitching.

Heretofore, so far as I am aware, no provision has been made in such post machines for effectually protecting either the brims of the hats from contact with the operating parts of the machine or the said operating parts from chips, fragments of shellac, or other foreign substances which are apt to accompany the hat-bodies, and which are liable to interfere with or damage the machine. I overcome these objections and adapt the machine to sew the sweats with equal facility upon either straight, roll, or broad-curved brimmed hats at or even inside the junction of the said crown and brim by, and this feature of my invention consists in, a work-plate supported upon a post a distance above the driving-shaft and adjoining parts of the mechanism sufficient to leave a space behind the said work-plate and post and above the driving-shaft to receive and accommodate the rim of a hat and permit of its being turned therein without danger of interfering with the relative position of the hat-brim and needle, the said work-plate having a comparatively narrow horizontal surface or top plate, and being formed with an inclined side plate or guiding-surface for the side crown of the hat, which incloses the operating mechanism below the work-plate upon the front side of the machine, and with a back plate or shield which incloses the shuttle-carrier and actuating parts and protects the brims of the hats having close-rolled brims from contact therewith.

Another feature of my invention consists in the special construction and arrangement, as hereinafter described, of the presser-foot bar and the side presser, or device for retaining the side crown of the hat or other article operated upon against the side plate with relation to each other in such manner that they may be connected or held in contact by an elastic or yielding pressure or tension, which will cause them to be simultaneously raised or lowered while releasing or securing the articles operated upon, thereby facilitating both operations, while the flexible coupling allows each to act independently of the other in performing its work.

Still another feature of my invention relates to the feed mechanism, and is designed, mainly, to secure a simple arrangement of parts in which the necessary movements and adjustments of the feed-dog may be attained with the minimum movement of the other parts of the mechanism, in which both the raising-cam and the driving-cam shall be always in contact with the bearing-surfaces upon which they act, thus avoiding all lost motion, play, or looseness, as well as undue wear, and in which the feed will invariably start forward from the same point with relation to the needle, irrespective of the adjustment of the feed-dog in regulating the length of the stitch; and it consists in the special construction and combinations of the parts hereinafter set forth—namely, of a pivoted lever against which the raising-cam acts and to which the feed-dog is fulcrumed, an intermediate independently-pivoted arm or lever for receiving the thrust of the driving-cam and imparting it to the feed-dog, (to which the retractile spring is attached,) formed and pivoted with relation to a longitudinally-adjustable-contact point upon the latter in such manner that it will always present a contact-surface parallel to the line of adjustment of the said point of contact upon the feed-dog when the concentric or inactive part of the driving-cam is in contact, so that, whatever the position of the contact-point upon the feed-dog may be with relation to the fulcrum of the intermediate cam-lever, the latter will always start the cam-dog forward from the same position. This desideratum of starting the feed from the same point with relation to the needle under all circumstances is of importance in all classes of sewing-machines, from the fact that as this point of departure is shifted farther from the needle it becomes more difficult to turn sharp curves and corners upon the article operated upon.

Still another feature of my invention relates to the mechanism for effecting the "dip" or retarding movement of the needle-bar, the object of which is to allow the shuttle time to enter the loop and pass the needle and to prevent undue strain upon the upper thread in lock-stitch machines. I am aware that this has been accomplished heretofore in a variety of ways, as by a suitable cross-piece attached to the needle-bar in which a crank-pin moves, or by a suitably-grooved cam attached to the main shaft and operating an oscillating arm connected with the needle-bar, also by means of a rock-shaft and lever connected to a link, which is in turn connected to the needle-bar at a point past the center; but these arrangements necessitate the use of square, flat, or feathered needle-bars, which soon wear loose and need to be replaced, owing to the constant tendency of these devices to twist the needle-bar, and are not adapted to being operated rapidly by steam-power. The object of this part of my invention is to afford a simple, powerful, and direct-acting mechanism which will obviate all lost motion, will permit of the employment of a hollow round needle-bar which is lighter, less subject to wear, and more easily replaced, when necessary, than a square or other angular bar, and that will constitute practically a balanced movement that will tend to counteract undue vibration while running at high speed. It consists, essentially, in imparting to the main rock-shaft, which actuates the needle-bar, a double reciprocal movement at every revolution of the driving-shaft through the medium of an oscillating arm and connecting-link interposed between the said main rock-shaft and an eccentric-rod operated by an eccentric on the main shaft, said oscillating arm being attached to an auxiliary rock-shaft or other suitable fulcrum, which is so situated with relation to the other parts that during the upward thrust of the eccentric-rod the oscillating arm and connecting-link will first elevate the rear arm of the main rock-shaft to which the link is connected until the centers of the link-connections become neutral, coinciding in a straight line with center of the auxiliary shaft or fulcrum, thus depressing the arm upon the opposite end of the main rock-shaft, to which the needle-bar is linked, when, the eccentric-rod still continuing to rise, the oscillating arm and link will draw down or depress the rear arm of the main rock-shaft, causing the latter in turn to elevate the needle-bar slightly until the eccentric-rod has commenced to recede or descend, when the oscillating arm and link will again elevate the rear arm of the main rock-shaft and cause the needle-bar to descend until the centers of the link-connections again become neutral and coincide in a straight line with the center of the auxiliary rock-shaft or fulcrum, after which, during the continuation and completion of the descent of the eccentric-rod, the oscillating arm and link will once more depress the rear arm of the main rock-shaft, causing the needle-bar to rise to its greatest elevation.

Another feature of my invention consists in a shuttle-raceway provided at its upper back portion with a spring which substantially conforms in shape to and practically constitutes a continuation of the upper side of the race, for the purpose of forcing the shuttle into and retaining it in the carrier. This, in conjunction with the opening in the back shield at this point, renders it practicable to conveniently insert or remove the shuttles into or from the carrier without disturbing any portion of the machine, and at the same time guard against undue play or looseness of the shuttle while in the carrier.

Figure 3:
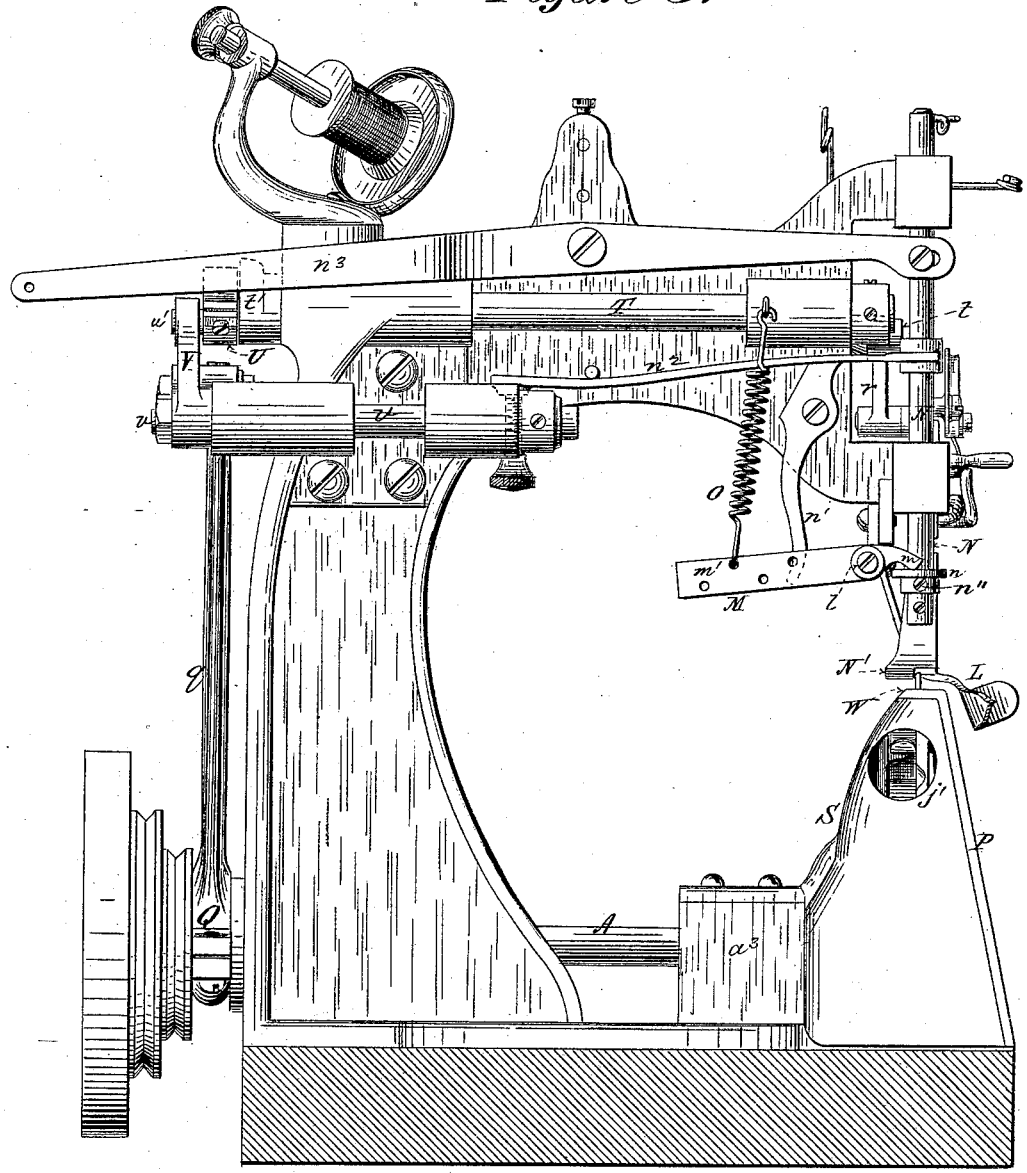
Figure 7:
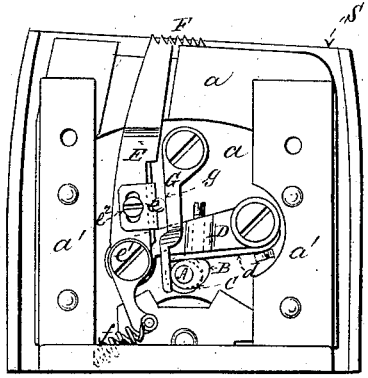
Figure 8:
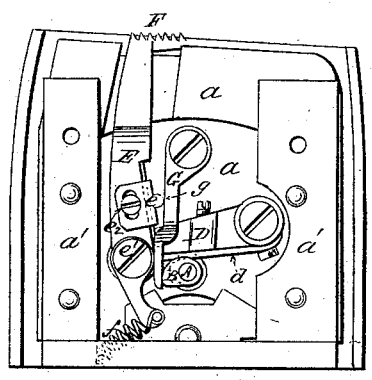
Figure 9:
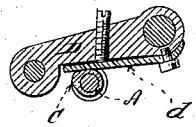
Figure 10:
Figure 11:
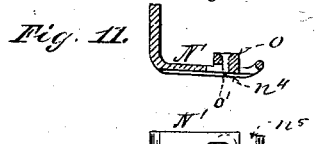
Figure 12:
Figure 13:
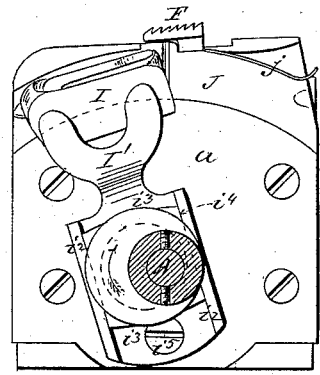
Figure 15:
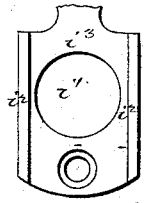
Figure 16:
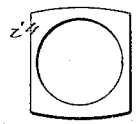
Figure 14:
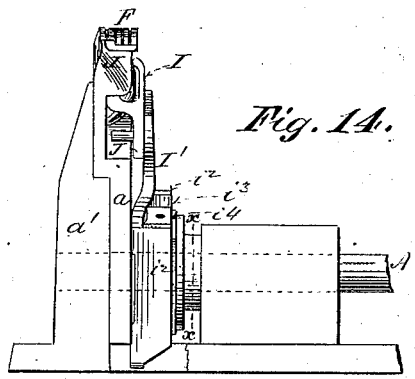
Figure 17:
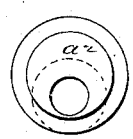
Figure 18:
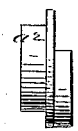

In the accompanying drawings, which illustrate my improvements as applied to a lock-stitch sewing-machine adapted to sewing sweats upon hats, and in which like letters of reference indicate corresponding parts, Figures 1, 2, 3, 4 show the machine when the needle-bar is at its lowest point and with the presser-foot and side presser elevated. Fig. 1 is an elevation of the front end of the machine; Fig. 2, a side elevation of the machine, taken from the position of the operator; Fig. 3, a similar elevation of the machine, taken from the opposite side; Fig. 4, an end elevation of the machine, showing the first neutral position of the eccentric-rod, vibrating arm, and connecting-link, the corresponding position of the needle-bar being shown in dotted lines. Fig. 5 is a detail view illustrating the dip or retarding mechanism at the time when the cam-rod has assumed its highest elevation. Fig. 6 is a similar view, showing the relative position of the parts at the time when the descending eccentric-rod has again brought the vibrating arm and connecting-link into the secondary neutral position during its downward stroke. Fig. 7 is a front elevation of the feed mechanism, (the work and guide plate being removed,) showing the relative positions of the parts when at rest. Fig. 8 is a similar view, showing the relative positions of the parts immediately after the completion of the advance of the feed. Fig. 9 is a longitudinal section of the raising-cam and the lever which receives its thrust, and to which the cam-dog is pivoted, showing the adjustable bearing-surface. Figs. 10, 11, and 12 are respectively top, vertical section, and bottom views of the presser-foot, showing the form of my improved needle-guide and re-enforcer. Fig. 13 is a section of the driving-shaft on plane of line $xx$, Fig. 14, and a rear elevation of the shuttle-race plate, (the back shield and work and guide plate being removed,) showing my improved mechanism for reciprocating the shuttle-carrier. Fig. 14 is a side elevation of the parts in the position shown in Fig. 13. Fig. 15 is an elevation of the lower portion of the shuttle-carrier, showing the longitudinal groove or way in which the eccentric sleeve travels. Fig. 16 is an elevation of the eccentric sleeve; and Figs. 17 and 18, respectively front and side elevations of the eccentric.

To the forward end of the driving-shaft A are attached the cams B C, for driving and elevating the feed F. These cams are preferably made of a single piece of metal, and, being attached to the outer extremity of the driving-shaft, may be conveniently removed and replaced when they become worn. The raising-cam C acts upon the under side of an arm or lever, D, which is pivoted at one extremity to the frame of the machine, while to the other extremity the feed-dog E is pivoted.

For the purpose of compensating for wear and for adjusting the upward projection of the feed F with accuracy, the lever D is provided with a movable bearing surface or plate, $d$, interposed between the body of the lever D and the raising-cam C, which plate $d$ is held farther from or nearer to the body of the lever D by means of one or more set-screws. This adjustable bearing-plate $d$ may be made in the form of a flat spring, if desired, attached at one end to the lever D, and being forced away from said lever by a set-screw, as indicated in the drawings. The fulcrum $e'$ of the feed-dog E being situated upon the raising-lever D, as stated, both the lever and the dog are drawn downward by a single spring, $f$, attached to the frame and connecting with the lower end of the feed-dog.

Instead of imparting the thrust of the driving-cam B directly against the feed-dog E, I employ an intermediate independently-pivoted lever, G, which receives the thrust of the cam and transmits it to the feed-dog. By this means I am enabled to provide for the convenient and accurate adjustment of the thrust of the feed F to regulate the length of stitch. This is accomplished by moving a contact piece or bearing, $e$, secured adjustably upon the feed-dog E and resting against the intermediate lever, G, longitudinally nearer to or farther from the feed-dog fulcrum $e'$, accordingly as it is desired to lengthen or shorten the stitch. For the purpose of accomplishing this adjustment without removing the side guide and work plate or other parts, the side guide-plate, P, is formed with an opening, $p$, (shown in Fig. 1,) opposite the contact-piece $e'$, which is secured in the desired position by a set-screw, $e^2$, or other similar securing device.

In order that the feed E may always start from the same position with relation to the needle, without regard to the length of movement imparted to the feed, the intermediate lever, G, is so pivoted to the frame of the machine, and its bearing-surface $g$, against which the contact-point $e$ of the feed-dog rests, is so formed, that when the inactive or concentric portion of the driving-cam D is in contact with it, its said bearing-surface $g$ will be parallel to the line of adjustment of the contact-point $e'$ upon the feed-dog, as shown in Fig. 7. Since the feed is retracted and at rest when the parts are in this relative position, it is obvious that the position of the point of contact between the feed-dog and the intermediate lever cannot affect the point of departure of the feed in the least. It will be noticed that by this contact arrangement of the feed mechanism I am enabled to attain the greatest necessary movement of the feed-dog with a comparatively slight degree of motion in the other parts, and that a single retractible spring insures the constant contact of the cams, which sustain most of the wear and are easily replaced.

Just back of the feed mechanism the shuttle mechanism is situated, the plate $a$, in which the feed-raceway is formed, and which is secured to upright posts $a'$ $a'$, affording a convenient support for the fulcrums of both devices, The shuttle receptacle or holder I is of ordinary construction, and the raceway J, in which it travels, is peculiar only in being formed at its upper rear end with a flexible upper wall or spring, $j$, which yields to allow the shuttle to be forcibly inserted into or removed from the holder I through an opening, $j'$, in the shield S, but is of sufficient strength when in its normal position to support and maintain the shuttle in its carrier.

The shuttle-rocker I', to the upper end of which the holder I is attached, is pivoted at its lower end to the frame or plate $a$ at a point below the driving-shaft A, and is therefore formed with an opening or space, $i'$, (shown in Fig. 15,) which allows it to straddle the said shaft and perform its oscillations without interference.

The body of the shuttle-carrier rocker is constructed with parallel shoulders $i^2$ $i^2$, which form a groove or passage, $i^3$, in which the rectangular sleeve $i^4$ rests. The sleeve $i^4$ is in turn formed to receive and fit the eccentric $a^2$, attached to the driving-shaft A, by which it is caused to reciprocate within the shuttle-carrier rocker. This arrangement affords a simple and direct means of imparting the requisite oscillation to the carrier-rocker, there being no lost motion or play. It also enables me, by properly regulating the position of the fulcrum $i^5$ with relation to the center of the driving-shaft A, to cause the shuttle-holder I, in its forward movement, to advance in, say, one-half the time that it occupies in receding, so as to carry the shuttle nearly past the needle before the latter begins to ascend, for the purpose hereinbefore stated. This will be understood by reference to Fig. 13, in which the shuttle-carrier is represented just after being thrown forward to its fullest extent and while beginning its retrograde movement, and by which it will be seen that the eccentric $a^2$, by acting through its sleeve $i'$ upon the lower part of the shuttle-rocker, near the fulcrum of the latter, will accelerate its forward movement, while during the remainder of the revolution of the eccentric, owing to the increased distance from the fulcrum, the backward movement of the carrier will be correspondingly retarded.

It is obvious that by varying the distance between the centers of the driving-shaft and the fulcrum of the carrier the relative time in which the forward and backward strokes of the latter will be effected may be varied.

The feed and the shuttle mechanism are inclosed and protected by the work-plate W, side guide-plate, P, and back shield, S. These are all elevated upon and secured to upright posts $a'\ a'$, or other suitable formations of the frame or bed of the machine, the side plate, P, and the back shield, S, converging upward to the work-plate W, which is made as narrow as practicable, for the purpose of adapting it and the upper portions of the back shield and side guide-plate to accommodate and project between the brim and side crown of a close-roll-brim hat.

The back shield, S, which is screwed to the bearing $a^3$, or otherwise secured to the frame, is made to conform as closely as possible to the shape and movements of the shuttle mechanism beneath, so as to afford as much space as possible behind the work-plate for the hat-brims.

The side guide-plate, P, is inclined inward and upward toward the needle, and is also concave, so that its upper edge, which merges into the work-plate W, approaches as close as practicable to the needle. This inclination and convexity of the guide-plate P, in conjunction with the work-plate of minimum width, renders it practicable to sew a sweat to a small close-roll-brim hat at or even inside the junction of the rim with the side of the crown, since the body of the hat can be inclined at a suitable angle with relation to the needle, while the roll-brim finds accommodation upon the opposite side of the work-plate. In this connection the back shield, S, is of importance in protecting the rim of the hat from contact with the shuttle mechanism, and also in protecting the latter from dirt and chips, which are especially plentiful when straw hats are being operated upon.

The side presser, L, for holding the side crown of the hat against the guide-plate P, is secured adjustably to a rock-shaft or fulcrum, $l$, mounted upon the frame of the machine. Secured to this rock-shaft or fulcrum $l$ is a lever, M, the short arm $m$ of which rests upon a shoulder, $n$, formed or secured upon the presser-bar N, or is otherwise made to engage with the latter, while the long arm $m'$ extends backward and is connected with a spring, O, secured to the frame of the machine in such manner that it tends constantly to press the short arm $m$ of the lever downward against its point of contact with the presser-bar N. By this means, whether the presser-bar N is raised or lowered by means of the hand-lever $n'$ acting against the under side of the presser-spring $n^2$, or through the medium of the treadle-lever $n^3$, connected to the presser-bar, the side presser, L, is caused to rise and descend simultaneously with the presser-foot, the spring O, attached to the side presser-lever, M, performing the double function of an elastic coupling between the devices and supplying the necessary amount of pressure to the side presser.

It is obvious that by properly regulating the position vertically of the point of contact between the short arm $m$ of the lever M and the presser-bar the latter will allow the side presser to act freely and independently after it has descended a certain distance, the side presser coming to rest against the inner side crown of the hat before the presser-foot reaches the brim, and to this end the bearing-shoulder $n$, or other means of connection with the lever M upon the presser-bar N, may be made adjustable vertically by a set-screw, $n''$, or other device, to adapt the arrangement to variations in the style and thickness of the articles to be operated upon.

The presser-foot N', in addition to being formed with the usual edge-guide, $n^4$, and the slot $n^5$, through which the edge of the hat-sweat or other article to be sewed on is fed, is formed with a needle guide and supporter, $o$, which consists of an annular shoulder of greater thickness vertically than the body of the foot, and presenting internally a continuous uniform guiding and sustaining surface, $o'$, in a transverse plane with relation to the needle.

This improved form of needle-guide is of especial importance when used in connection with machines of the character herein described, and in similar machines in which considerable resistance has to be overcome by the needle, the frequency with which the needles bend laterally and break greatly retarding the use of such machines and preventing their being run by steam at high speed. Actual experience has demonstrated that this difficulty is avoided by the use of my guide, which sustains the needle laterally upon all sides, effectually counteracting any tendency to bend, and, by thus preserving the alignment of the needle, enabling it more readily to overcome the resistance offered to it during its downward stroke.

Upon the rear end of the driving-shaft A is situated the eccentric Q, which causes the vertical reciprocation of the needle-bar R. This is effected through the medium of a rock-shaft, T, mounted in suitable bearings upon the upper frame of the machine, and extending longitudinally the greater portion of the length of the latter. The needle-bar is attached to the rock-shaft T by means of a link, $r$, which is pivoted to an arm, $t$, projecting from the front end of the rock-shaft.

Interposed between the upper end of the ing the thrust of the driving-cam and transmitting it to the feed-dog, in combination with a driving-shaft provided with suitable cams which engage with and actuate the said parts, substantially in the manner and for the purpose described.

5. In a sewing-machine, the combination, with a feed-operating mechanism consisting of an oscillating arm or lever which receives the thrust of the raising-cam, and to which the feed-dog is pivoted, and an intermediate lever pivoted independently to a stationary part of the machine, and receiving the thrust of the driving-cam and transmitting it to the feed-dog, and with a driving-shaft provided with suitable cams for operating the same, of a retractile spring having one of its ends secured to a stationary part of the machine, while the other end is connected with said mechanism in such manner that it tends constantly to maintain the engagement of the parts with each other and the driving-cams, substantially in the manner and for the purpose described.

6. In a sewing-machine feed-actuating mechanism which consists, substantially, of an oscillating arm or lever which receives the thrust of the raising-cam, and to which the feed-dog is pivoted, and an intermediate lever pivoted independently to a stationary part of the machine, and receiving the thrust of the driving-cam and transmitting it to the feed-dog, and a driving-shaft provided with suitable cams for operating the said parts, a longitudinally-adjustable bearing upon the feed-dog, for the purpose of varying the point of contact between the latter and the said intermediate driving-cam lever for the purpose of regulating the throw of the feed, substantially in the manner and for the purpose described.

7. In combination with a sewing-machine feed-operating mechanism which consists, substantially, of an oscillating arm or lever which receives the thrust of the raising-cam, and to which the feed-dog is pivoted, and an intermediate lever pivoted independently to a stationary part of the machine, and receiving the thrust of the driving-cam and transmitting it to the feed-dog, a driving-shaft provided with suitable cams which engage with and actuate the said parts, the intermediate driving-lever being so formed and pivoted with relation to the feed-dog that it will present a bearing or contact surface to and for engagement with the latter in a plane parallel to the line of adjustment of the adjustable contact-piece upon the said dog when the concentric or inactive parts of the cams are in contact with their levers and the mechanism is at rest, for the purpose and substantially in the manner set forth.

8. In a sewing-machine provided with a feed-operating mechanism substantially such as herein set forth, an inclosing side or guide plate formed with a suitable aperture opposite to and coinciding with the position of the longitudinally-adjustable contact-piece, to which the thrust of the driving-cam is imparted, upon the feed-dog, for the purpose of allowing the horizontal movement of the feed to be regulated without removing any of the parts, substantially in the manner and for the purpose described.

9. In a sewing-machine, an oscillating arm and connecting-link interposed between the rear arm of a rock-shaft, to the front end of which the needle-bar is connected, and an eccentric-rod connected with an eccentric upon the driving-shaft, the said oscillating arm being connected directly to one and indirectly by the link to the other, and being mounted upon an auxiliary rock-shaft or other suitable fulcrum at such point with relation to the said main rock-shaft and the upper end of the eccentric-rod that at each revolution of the driving-shaft and eccentric a double reciprocal or retarding dip movement will be imparted to the main rock-shaft and needle-bar, substantially in the manner and for the purpose described.

10. In a sewing-machine, an upright shuttle-race plate constructed with a shuttle-race having one of its walls at the rear extremity formed of a flat spring or other elastic segment, which, when in its normal position, tends to retain the shuttle in its holder, but which will yield sufficiently to permit of the insertion or removal of the shuttle into or from the shuttle-holder while the latter is in that portion of the raceway, in combination with a shuttle-holder and oscillating mechanism substantially such as herein designated.

11. The combination, in a sewing-machine, of a shuttle-carrier and oscillating mechanism protected and inclosed by a back plate or shield, substantially as herein set forth, and a shuttle-raceway having one of its walls at its rear extremity formed of a spring or other elastic segment, which will allow the shuttle to be inserted into or removed from the shuttle-holder through a coinciding aperture in the back plate or shield, and which, when in its normal position, will tend to retain the shuttle in position in the holder, substantially in the manner and for the purpose described.

12. In a sewing-machine, the combination, with a shuttle-race plate constructed with a shuttle-raceway having one of its walls at the rear extremity formed of a flat spring or other elastic segment, which, when in its normal position, tends to retain the shuttle in its holder, but which will yield sufficiently to permit of the insertion or removal of the shuttle into or from the shuttle-holder, while the latter is in that portion of the raceway, and with a shuttle-holder and oscillating mechanism substantially such as designated, of a back plate or shield inclosing and protecting the said parts, formed with an opening opposite to and coinciding with the rear extremity of the said raceway, for the purpose of allowing the insertion or removal of the shuttle from its carrier, substantially as herein set forth.

13. In a sewing-machine, an upright shuttle-race plate secured to two posts projecting vertically from the base of the machine-frame, eccentric-rod $q$ and the rear arm, $t'$, (which extends in a direction opposite to that of the needle-arm $t$,) of the rock-shaft T is an oscillating arm, V, and short link U. The oscillating arm V is secured to an independent fulcrum or auxiliary rock-shaft, $e$, and is connected directly to the upper end of the eccentric-rod $q$ and indirectly to the outer end of the rear arm, $t'$, of the rock-shaft T by the link U.

The position of the auxiliary rock-shaft or fulcrum $e$ is so regulated with relation to the main rock-shaft T and driving-shaft A that at every revolution of the latter the following movements will occur. As the revolution of the driving-shaft A causes the eccentric Q to elevate the eccentric-rod $q$, the latter, acting through the medium of the oscillating arm V and link U, will elevate the rear arm, $t'$, of the main rock-shaft T, thereby causing the needle-bar to descend until the connection-centers $u$ $u'$ of the link U coincide in a straight line with the center of the auxiliary shaft or fulcrum $e$, as shown in Fig. 4, in which position the oscillating arm V and link U are neutral with relation to the main rock-shaft. As the eccentric Q continues to elevate the eccentric-rod $q$ the oscillating arm V will cause the link to depress the rear arm, $t'$, of the main rock-shaft T for a short distance until the eccentric-rod $q$ has reached its highest point, thus elevating the needle-bar slightly, as illustrated in Fig. 5. As the eccentric Q causes the eccentric-rod $q$ to descend from this point the oscillating arm V will cause the link U to again elevate the rear arm, $t'$, of the main rock-shaft T until the connection-centers $u$ $u'$ of the link again coincide in a straight line with the center of the auxiliary rock-shaft or fulcrum $e$, thus causing the oscillating arm V and link U to resume their neutral position with relation to the main rock-shaft, by which time the needle-bar has again been returned to its lowest position, as indicated in Fig. 6, in which it will be seen that the relative positions of all the centers is the same as that shown in Fig. 4, except that of the eccentric Q. As the eccentric Q continues to depress the eccentric-rod $q$ the oscillating arm V causes the link to depress the rear arm, $t'$, of the main rock-shaft T, thereby elevating the needle-bar until the eccentric again causes the eccentric-rod to ascend, when the movements described are repeated. I thus effect the dip or retarded action of the needle to allow the latter to throw out the lock and the shuttle to enter it by means of a positive-movement mechanism in which there is no play or lost motion, and which does not subject the needle-bar to any torsional strain, thereby admitting of the use of a comparatively light hollow cylindrical needle-bar which may be conveniently replaced when worn. It will be noticed that I also attain by this arrangement what is known as a "balanced movement," the needle-bar and its connections with the main rock-shaft being arranged and exerting their weight upon the side of the latter opposite to that upon which the eccentric-rod and its connections are arranged, so that the needle-bar descends while the eccentric-rod, &c., rise, and vice versa, thus tending to counteract and prevent undue vibration when the machine is running fast.

In the avoidance of all lost motion or jar by the use of the positive movement, and by the arranging of a light hollow needle-bar, and by arranging the parts as far as possible so as to balance each other and avoiding all crank-movements, as set forth, I attain a very smooth and light running machine.

The construction and operation of the machine in other respects are substantially the same as in those heretofore known and used, and therefore require no special mention.

What I claim as my invention, and desire to secure by Letters Patent, is—

1. In combination with an inclined side guide-plate and a narrow work-plate elevated above the driving-shaft of the machine, substantially in the manner and for the purpose described, a back plate or shield the upper edge of which coincides with and conforms to the shape of the back of the work-plate, from which it extends downward, inclosing the shuttle mechanism, for the double purpose of protecting the latter from foreign substances and shielding the articles under operation from contact with the working mechanism, substantially in the manner and for the purpose described.

2. In a sewing-machine, a side presser for holding the article operated upon against a side guide-plate mounted upon a rock-shaft or fulcrum, to which is secured a lever, the short arm of which engages with the presser-rod and the long arm of which is connected with a spring, which furnishes the necessary amount of pressure to the side presser and causes it to rise and fall with the presser foot and bar, substantially in the manner and for the purpose described.

3. In a sewing-machine provided with a side presser for holding a portion of the article to be operated upon against a side guide-plate, and a presser-rod and foot for holding another portion of the article to be operated upon against the work-plate, the said devices being connected in such manner that they may be raised and lowered simultaneously, substantially as set forth, a bearing or point of connection which is adjustable longitudinally upon the presser-rod for receiving or engaging with one arm of a lever secured to the side presser, in combination with said lever, the opposite arm of which is connected with a spring which tends to force the side presser downward toward the side plate, substantially in the manner and for the purpose described.

4. In a sewing-machine, a feed-operating mechanism consisting of an oscillating arm or lever which receives the thrust of the raising-cam, and to which the feed-dog is pivoted, and an intermediate lever pivoted independently to a stationary part of the machine, and receiv-

5 and having an adjustable feed mechanism, substantially such as described, secured to its front or outer side, and an oscillating shuttle mechanism, substantially such as described, secured to its opposite or inner side, both said feed and shuttle mechanisms being operated by suitable cams upon a driving-shaft, which passes between said posts and through the said plate, in combination with a back plate or shield for protecting the said shuttle mechanism, and with a front plate or shield which protects the feed mechanism, formed with a suitable aperture, through which the adjustment of the motion of the feed may be effected, substantially as described.

WILLIAM F. BEARDSLEE.

Witnesses:
DAVID W. WILLIAMS,
AUSTIN A. MARTIN.